United States Patent
Zhou et al.

(10) Patent No.: US 11,263,446 B2
(45) Date of Patent: Mar. 1, 2022

(54) METHOD FOR PERSON RE-IDENTIFICATION IN CLOSED PLACE, SYSTEM, AND TERMINAL DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Peiming Zhou, Beijing (CN); Yu Chen, Beijing (CN); Yun Ye, Beijing (CN); Aixi Zhang, Beijing (CN); Junhui Wu, Beijing (CN); Zhi Weng, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 16/758,556

(22) PCT Filed: Sep. 18, 2018

(86) PCT No.: PCT/CN2018/106143
§ 371 (c)(1),
(2) Date: Apr. 23, 2020

(87) PCT Pub. No.: WO2019/080669
PCT Pub. Date: May 2, 2019

(65) Prior Publication Data
US 2020/0349348 A1    Nov. 5, 2020

(30) Foreign Application Priority Data
Oct. 23, 2017 (CN) .......................... 201710996027.4

(51) Int. Cl.
*G06K 9/00* (2006.01)
*G06T 7/73* (2017.01)
(Continued)

(52) U.S. Cl.
CPC ..... *G06K 9/00369* (2013.01); *G06K 9/00771* (2013.01); *G06K 9/4609* (2013.01);
(Continued)

(58) Field of Classification Search
None
See application file for complete search history.

(56) References Cited

U.S. PATENT DOCUMENTS

| | | | |
|---|---|---|---|
| 8,010,402 B1* | 8/2011 | Sharma | G06Q 10/00 705/7.29 |
| 2015/0023562 A1* | 1/2015 | Moshfeghi | G06T 7/292 382/106 |

FOREIGN PATENT DOCUMENTS

| | | |
|---|---|---|
| CN | 101795395 A | 8/2010 |
| CN | 102708606 A | 10/2012 |

(Continued)

OTHER PUBLICATIONS

"Multi-camera collaborative attention target detection and tracking technology".
(Continued)

*Primary Examiner* — Delomia L Gilliard
(74) *Attorney, Agent, or Firm* — Qinghong Xu (57) ABSTRACT

The present disclosure provides a method, system, and terminal device for re-identifying a person in a closed place, relating to the field of video processing technologies. The method comprises: dividing a closed place into a plurality of regions comprising an entrance region, any of the regions comprising at least one camera for photographing; confirming a person first entering based on a trajectory tracking of (Continued)

the person in the entrance area, and assigning a unique identity number to the person, acquiring and recording feature information thereof and binding the identity number with the feature information; and when re-identification of a person in the closed place is performed, matching person's feature information captured by the camera of the region where the person is, with recorded feature information selecting the identity number bound with recorded feature information that best matches the feature information of the person as the identity number of the person.

18 Claims, 4 Drawing Sheets

(51) Int. Cl.
*G06K 9/46* (2006.01)
*G06N 3/08* (2006.01)
*G06T 7/20* (2017.01)

(52) U.S. Cl.
CPC ............... *G06N 3/08* (2013.01); *G06T 7/20* (2013.01); *G06T 7/74* (2017.01); *G06T 2207/30196* (2013.01); *G06T 2207/30241* (2013.01)

(56) References Cited

FOREIGN PATENT DOCUMENTS

| | | | |
|---|---|---|---|
| CN | 102831683 | A | 12/2012 |
| CN | 102982598 | A | 3/2013 |
| CN | 103049734 | A | 4/2013 |
| CN | 103793721 | A | 5/2014 |
| CN | 105160319 | A | 12/2015 |
| CN | 105872979 | A | 8/2016 |
| CN | 105933650 | A | 9/2016 |
| CN | 106096568 | A | 11/2016 |
| CN | 106650639 | A | 5/2017 |

OTHER PUBLICATIONS

The CN1OA dated Jul. 22, 2020 by the CNIPA.
The ISR dated Nov. 23, 2018 by the WIPO.

\* cited by examiner

METHOD FOR PERSON RE-IDENTIFICATION IN CLOSED PLACE, SYSTEM, AND TERMINAL DEVICE

CROSS-REFERENCE TO RELATED APPLICATIONS

The present application is based upon International Application No. PCT/CN 2018/106143, filed on Sep. 18, 2018, which is based upon and claims priority of Chinese patent application No. 201710996027.4, filed on Oct. 23, 2017, the contents of which are hereby incorporated by reference in its entirety.

TECHNICAL FIELD

The present disclosure relates to the field of video processing, and in particular, to a method, a system, and a terminal device for re-identifying a human being in a closed place.

BACKGROUND

The identification technology of the person's identity, especially the re-identification technology of the person's identity in a closed public place, can be used for smart settlement, security, passenger flow analysis, etc. in shopping malls, schools, hospitals, subways, etc.

There are mainly two existing manners for re-identifying a person's identity: one is based on trajectory tracking of the person, and the other is based on features of the person (such as features of clothing color, stature, etc.). The above two manners are both under development and have not yet reached maturity.

There are still many disadvantages for real-time identification of the person's identity in the field of video surveillance, as follows.
a. When a monitoring area is relatively narrow, there are dead angles on a screen of a single camera, and there are situations such as occlusion, crossover, etc. between the persons, and the persons may enter into and leave the place randomly. It is difficult for the existing person trajectory tracking technology to correctly track trajectories of multiple persons in the place.
b. For features such as the person's dress and posture, it is difficult to distinguish them with extracted features of the existing neural network. Therefore, purely based on features of the person for identification of the identity, the accuracy is poor.
c. The efficiency of the existing technologies is also difficult to achieve real-time processing.

Therefore, a novel method for re-identifying a person's identity is needed.

The information disclosed in the Background section above is only for enhancing the understanding of the background of the present disclosure, and thus may include information that does not constitute prior art known to those of ordinary skill in the art.

SUMMARY

The purpose of the present disclosure is to provide a method, system and terminal device for re-identifying a human being in a closed place, so as to overcome one or more problems caused by the limitations and defects of the related art at least to some extent.

Other features and advantages of the present disclosure will become apparent from the following detailed description, or may be learned in part through the practice of the present disclosure.

According to a first aspect of the present disclosure, a method for re-identifying a human being in a closed place is disclosed, including:

dividing the closed place into multiple areas comprising an entrance area, and having at least one camera for shooting in any area;

confirming a human being first entering based on a trajectory tracking of the human being in the entrance area, assigning a unique identity number to the human being, acquiring and recording the feature information of the human being, and binding the identity number with the feature information of the human being; and when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

According to an exemplary embodiment of the present disclosure, the method further includes: when the human being leaves, deleting the feature information of the human being and marking the human being as having left.

According to an example implementation of the present disclosure, having at least one camera for shooting in any area includes:

having two cameras with different shooting angles for shooting in any area.

According to an exemplary embodiment of the present disclosure, confirming a human being first entering based on a trajectory tracking of the human being in the entrance area includes: judging whether the human being is the human being first entering according to a trajectory of the human being displayed on continuous shot screens with multiple frames of the entrance area.

According to an exemplary embodiment of the present disclosure, acquiring feature information of the human being is performed by a convolutional neural network technology.

According to an exemplary embodiment of the present disclosure, the feature information of the human being includes: stature, dress, and/or appearance.

According to an exemplary embodiment of the present disclosure, matching the feature information of the human being captured by the camera in an area where the human being is with the recorded feature information includes: performing matching on all human beings in the area.

According to an exemplary embodiment of the present disclosure, the feature information and the identity number are stored in a human being feature database.

According to a second aspect of the present disclosure, a system for re-identifying a human being in a closed place is disclosed, including:

a monitoring module, configured to divide the closed place into multiple areas comprising an entrance area, and have at least one camera for shooting in any area;

a first entered human being confirmation module, configured to confirm a human being first entering based on a trajectory tracking of the human being in the entrance area, assign a unique identity number to the human being, acquire and record the feature information of the human being, and bind the identity number with the feature information of the human being; and a re-identification module, configured to: when re-identification of a human being in the closed place is performed, match the feature information of the human being captured by the camera in an area where the human being is with recorded feature information, and select the identity number bound with the recorded feature information that best matches the feature information of the human being as the identity number of the human being.

According to an exemplary embodiment of the present disclosure, the system further includes a feature database, configured to store the feature information and the identity number.

According to a third aspect of the present disclosure, a computer-readable storage medium having a computer program stored therein is disclosed, wherein the program, when executed by a processor, causes the implementation of following steps of the method:

dividing the closed place into multiple areas comprising an entrance area, and having at least one camera for shooting in any area;

confirming a human being first entering based on a trajectory tracking of the human being in the entrance area, assigning a unique identity number to the human being, acquiring and recording the feature information of the human being, and binding the identity number with the feature information of the human being; and when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

According to a fourth aspect of the present disclosure, a terminal device is disclosed, including:

a processor; and a memory storing instructions for the processor to control the following operations:

dividing the closed place into multiple areas comprising an entrance area, and having at least one camera for shooting in any area;

confirming a human being first entering based on a trajectory tracking of the human being in the entrance area, assigning a unique identity number to the human being, acquiring and recording the feature information of the human being, and binding the identity number with the feature information of the human being; and when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

According to a fifth aspect of the present disclosure, a system for re-identifying a human being in a closed place is disclosed, including:

a processor; and a memory storing instructions for the processor to control the following operations:

dividing the closed place into multiple areas including an entrance area, and having at least one camera for shooting in any area;

confirming a human being first entering based on a trajectory tracking of the human being in the entrance area, assigning a unique identity number to the human being, acquiring and recording the feature information of the human being, and binding the identity number with the feature information of the human being; and when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

According to an exemplary embodiment of the present disclosure, the processor is further configured to delete the feature information of the human being and marking the human being as having left, when the human being leaves.

According to an exemplary embodiment of the present disclosure, having at least one camera for shooting in any area includes: having two cameras with different shooting angles for shooting in any area.

According to an exemplary embodiment of the present disclosure, confirming a human being first entering based on a trajectory tracking of the human being in the entrance area includes: judging whether the human being is the human being first entering according to a trajectory of the human being displayed on continuous shot screens with multiple frames of the entrance area.

According to an exemplary embodiment of the present disclosure, acquiring feature information of the human being is performed by a convolutional neural network technology.

According to an exemplary embodiment of the present disclosure, the feature information of the human being includes: stature, dress, and/or appearance.

According to an exemplary embodiment of the present disclosure, matching the feature information of the human being captured by the camera in an area where the human being is with the recorded feature information includes: performing matching on all human beings in the area.

According to an exemplary embodiment of the present disclosure, the feature information and the identity number are stored in a human being feature database.

According to some exemplary embodiments of the present disclosure, by adopting a solution with combination of the multi-camera-based, the trajectory tracking and feature matching, the problem of the human being re-identification in real-time and in the complex scene is solved, achieving a better effect of the human being re-identification.

According to some exemplary embodiments of the present disclosure, by disposing multiple cameras in the place to cover different areas and different angles, any area can be shot by two or more cameras from different angles, which can solve the problem of occlusion between the human beings.

According to some exemplary embodiments of the present disclosure, by performing association matching on all human beings in the entire screen, associating and matching all human beings with the identities can help find global optimal matching, which improves the tolerance of feature comparison greatly compared with the human being re-identification in a single detection box.

It should be noted that the above general description and the following detailed description are merely exemplary and explanatory and should not be construed as limiting of the disclosure,

BRIEF DESCRIPTION OF THE DRAWINGS

The above and other objects, features, and advantages of the present disclosure will become more apparent by describing its exemplary embodiments in detail with reference to the accompanying drawings.

DETAILED DESCRIPTION

Exemplary embodiments will now be described more fully with reference to the accompanying drawings. However, the exemplary embodiments can be implemented in a variety of forms and should not be construed as being limited to the examples set forth herein; rather, these exemplary embodiments are provided so that this disclosure will be more comprehensive and complete, so as to convey the idea of the exemplary embodiments to those skilled in this art. The drawings are merely schematic representations of the present disclosure and are not necessarily drawn to scale. The same reference numerals in the drawings denote the same or similar parts, and the detailed description thereof will be omitted.

In addition, the features, structures, or features described above may be combined in any suitable manner in one or more embodiments. In the description below, numerous specific details are set forth to provide a thorough understanding of the exemplary embodiments of the present disclosure. However, those skilled in the art will appreciate that the technical solution of the present disclosure may be practiced without one or more of the specific details, or other methods, components, steps, and the like may be employed, in other instances, well-known structures, methods, implementations, or operations are not shown or described in detail to avoid obscuring various aspects of the present disclosure.

Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

An object of the present disclosure is to provide a method, a system, and a terminal device for re-identifying a human being in a closed place. The method for re-identifying a human being in a closed place includes: dividing the closed place into multiple areas including an entrance area, and having at least one camera for shooting in any area confirming a human being first entering based on a trajectory tracking of the human being in the entrance area, assigning a unique identity number to the human being, acquiring and recording the feature information of the human being, and binding the feature information with an identity number; and when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being. By adopting a solution with combination of the trajectory tracking and feature matching, the problem of the human being re-identification in real-time and in the complex scene is solved, achieving a better effect of the human being re-identification. Meanwhile, by disposing multiple cameras in the place to cover different areas and different angles, any area can be shot by two or more cameras from different angles, which can solve the problem of occlusion between the human beings. In addition, by performing association matching on all human beings in the entire screen, associating and matching all human beings with the identities can help find global optimal matching, which improves the tolerance of the feature comparison greatly compared with the human being re-identification in a single detection box.

Figure 1:
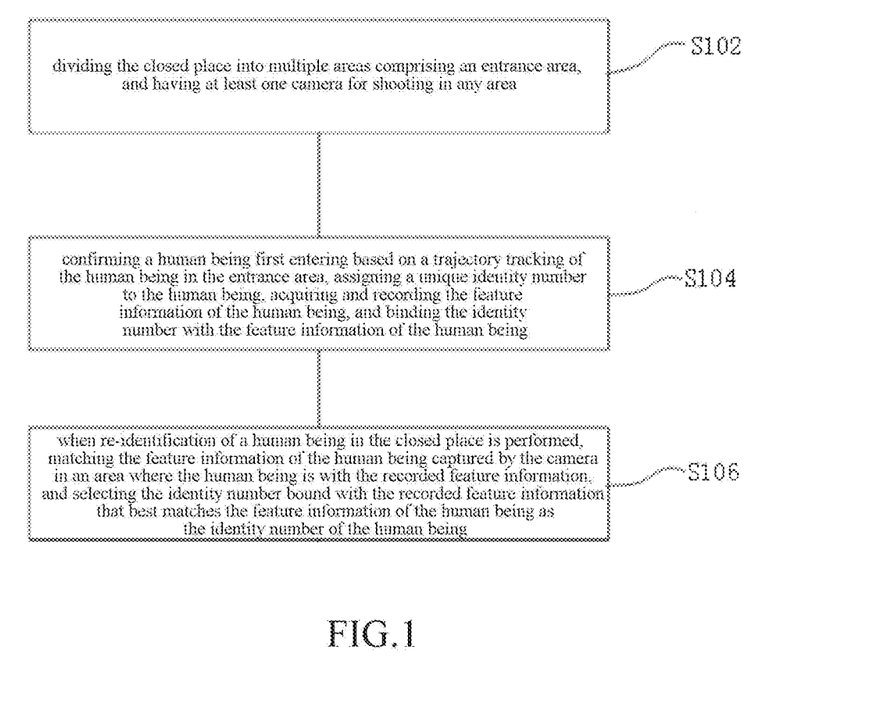
FIG. 1 shows a flowchart of a method for re-identifying a human being in a closed place according to an exemplary embodiment of the present disclosure.
Figure 2:
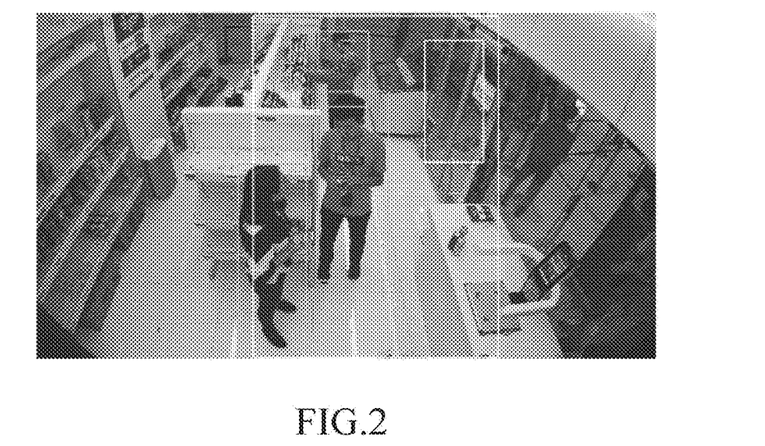
FIG. 2 shows a real shot picture of an entrance area in a closed place.
Figure 3:
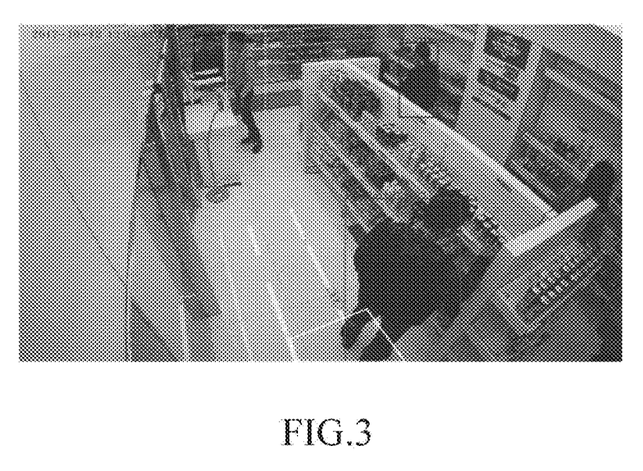
FIG. 3 shows a real shot picture of a non-entrance area in a closed place.
Figure 4:
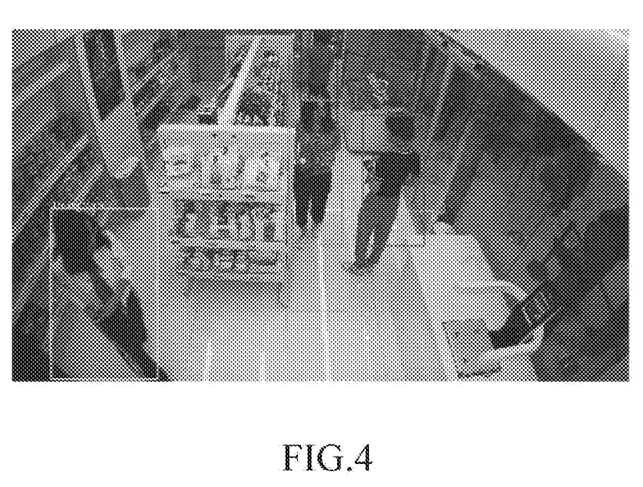
FIG. 4 shows another real shot picture of an entrance area in a closed place.
Figure 5:
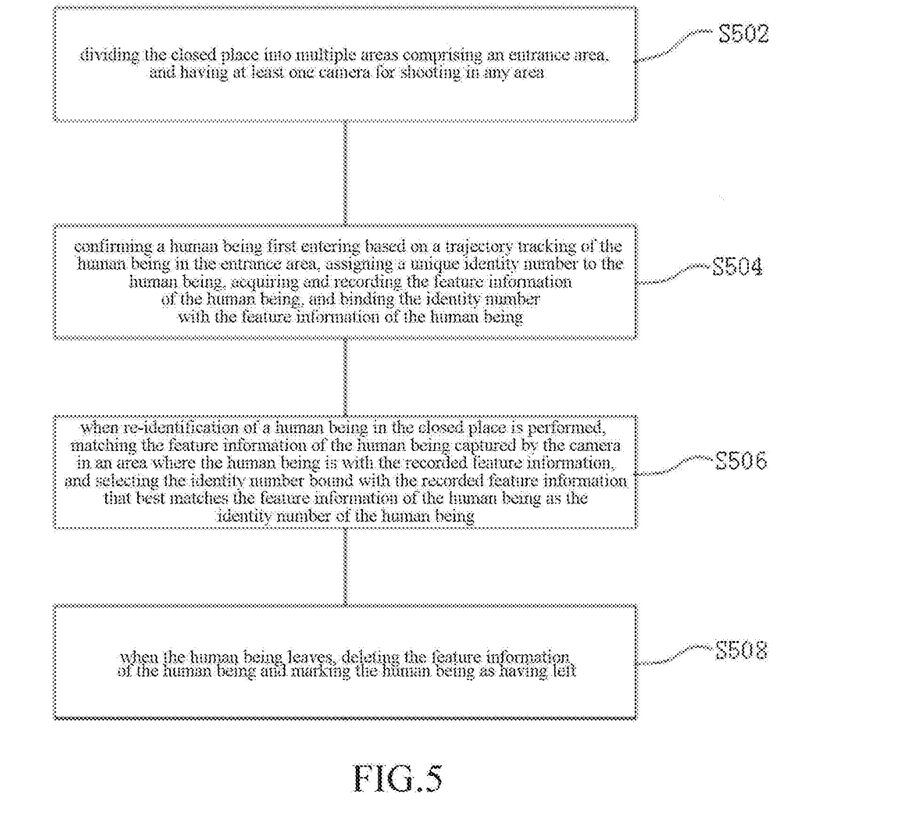
FIG. 5 shows a flowchart of a method for re-identifying a human being in a closed place according to another exemplary embodiment of the present disclosure.
Figure 6:
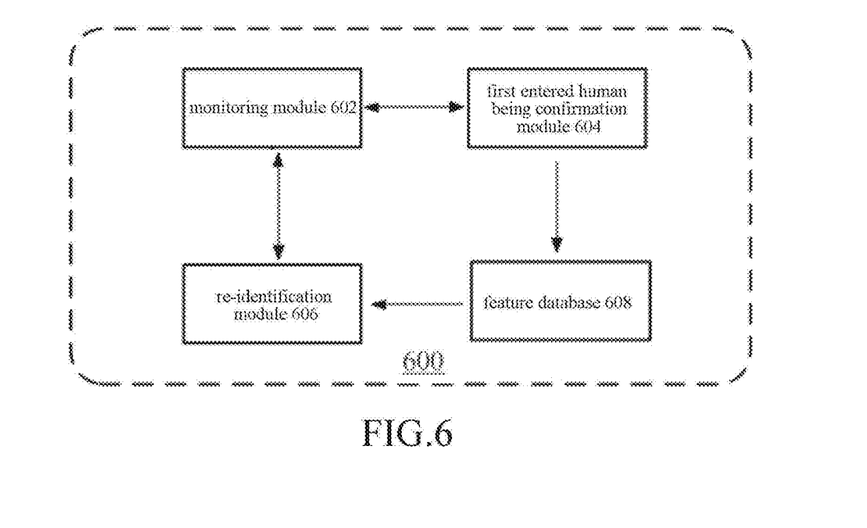
FIG. 6 shows a block diagram of a system for re-identifying a human being in a closed place according to an exemplary embodiment of the present disclosure.
Figure 7:
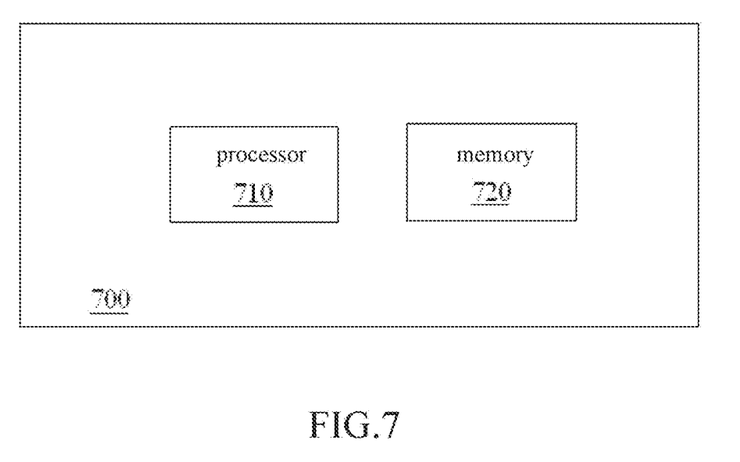
FIG. 7 shows a terminal device according to an exemplary embodiment of the present disclosure.

The method, system, and terminal device for re-identifying a human being in a closed place according to the present disclosure will be described in detail below with reference to FIGS. 1-7. FIG. 1 shows a flowchart of a method for re-identifying a human being in a closed place according to an exemplary embodiment of the present disclosure; FIG. 2 shows a real shot picture of an entrance area in a closed place; FIG. 3 shows a real shot picture of a non-entrance area in a closed place; FIG. 4 shows another real shot picture of an entrance area in a closed place; FIG. 5 shows a flowchart of a method for re-identifying a human being in a closed place according to another exemplary embodiment of the present disclosure; FIG. 6 shows a block diagram of a system for re-identifying a human being in a closed place according to an exemplary embodiment of the present disclosure; FIG. 7 shows a terminal device according to an exemplary embodiment of the present disclosure.

It should be particularly noted herein that the exemplary embodiment of the present disclosure uses the human being re-identification in an unmanned convenience store as an example for description, but the present disclosure is not limited thereto. The method, system, and terminal device for re-recognizing a human being in a closed place of the present disclosure can also apply to smart settlement, security, passenger flow analysis, etc. in shopping malls, schools, hospitals, subways, etc.

First, a method for re-identifying a human being in a closed place according to the present disclosure will be described in detail with reference to FIGS. 1-5. FIG. 1 shows a flowchart of a method for re-identifying a human being in a closed place according to an exemplary embodiment of the present disclosure; FIG. 2 shows a real shot picture of an entrance area in a closed place; FIG. 3 shows a real shot picture of a non-entrance area in a closed place; FIG. 4 shows another real shot picture of an entrance area in a closed place; FIG. 5 shows a flowchart of a method for re-identifying a human being in a closed place according to another exemplary embodiment of the present disclosure.

Before the embodiments are described in detail, a model to re-identify the human being in the closed place used by the present disclosure is introduced briefly: when a human being enters the closed place, the system notifies the algorithm there is a human being first entering. The human being first entering is bound based on the human being tracking and the feature information of the human being first entering is collected in the present disclosure. When the human being leaves, the system notifies the human being has left, and the feature information of the human being is deleted, and the human being is marked as having left. When the human being is in the place, the identity information of the human being at any position can be given at any time. For example, at 9:30 on Oct. 10, 2017, the human being appearing in a certain area at a certain location is Tonny (just an assumed name, the identity number can also be used instead of the name, i.e., naming them directly as 1, 2, . . . n).

FIG. 1 shows a flowchart of a method for re-identifying a human being in a closed place according to an exemplary embodiment of the present disclosure.

In S102, the closed place is divided into multiple areas including an entrance area, and there is at least one camera used for shooting in any area.

Since the above closed place may be relatively narrow, there are dead angles on a screen of the single camera, and there are situations such as overlapping, occlusion, etc. between the human beings, the multi-camera arrangement is usually used. Multiple cameras are disposed in the place to cover different angles and different areas. The principle is that any area can be shot by two or more cameras from different angles, which can solve the problem of occlusion between the human beings.

In addition to eliminating the dead corners in the place, each of the multiple cameras has a respective function, as described below a. A main camera monitors the entrance area to monitor the human being first entering, and tracks the human being to acquire features of the human being (such as front, side, back clothing, physical features). The reason why the entrance area is selected to collect features is that this area is relatively wide, and there is less interference such as occlusion and overlapping between the human beings so as not to confuse the features due to tracking errors.

As shown in FIG. 2, the larger white box is the range of the tracking area, the smaller white box is the position of the entrance (roughly drawn). According to the trajectory analysis of the human being in the area, the human being who newly enters the entrance can be monitored and the feature information of the human being can be acquired.

b. Other cameras are configured to re-identify the human being. Depending on the angle of the respective camera, each area of the place is designated one responsible camera. When the identity of a human being in a certain area needs to be identified, a designated responsible camera corresponding to the area can be found, and a screen at the corresponding moment is retrieved, as shown in FIG. 3.

It should be particularly noted herein that the number of the cameras for monitoring the entrance area may be one or multiple, and the present disclosure is not limited thereto. For example, only one camera may be used to both monitor the human being first entering and re-identify the human being in the entrance area; or one camera is used to monitor the human being first entering, and at the same time, another camera or multiple cameras with different shooting angles are used to re-identify the human being in the entrance area, in order to improve the efficiency and real-time processing.

In S104, a human being first entering is confirmed based on a trajectory tracking of a human being in the entrance area, a unique identity number is assigned to the human being first entering, feature information of the human being first entering is acquired and recorded, and the identity number is bound with the feature information of the human being.

The existing human being tracking technology can be divided into real-time tracking and multi-frame global tracking according to time. The former directly predicts the position of the human being in the next frame based on the position and feature information of the human being at the previous time, which can be used for real-time video surveillance. The latter is to "detect+associate" the human beings in all frames of the captured video, and can only be used for postmortem video analysis.

Considering from the perspective of performance, multi-frame global tracking can make full use of multi-frame information, achieving a better effect in solving occlusion between the human being s, and the human being disappearing from the screen for a long time or a short time, and having a stronger anti-interference ability. The disadvantage is that the tracking results cannot be given in real time. The problem to be solved by the tracking of the present disclosure is the binding of the human being first entering with the identity, and the collection of the feature information, so there is no need to give the tracking path in real time, and the present disclosure adopts the multi-frame global tracking scheme.

The specific method is to judge whether the human being is the human being first entering according to a trajectory of the human being displayed on continuous shot screens with multiple frames of the entrance area. For example, when the trajectory of the human being shows a direction extending from the outside of the entrance to the inside of the entrance (Of course, other auxiliary judging conditions can also be added), it can be determined that the human being is a human being first entering and can be assigned a unique identity number. After confirming that there is the human being first entering, the present disclosure enables the detection and tracking for a predetermined duration, for example, 5 seconds (which can be selected in the range of 3-10 seconds based on needs) for the entrance area, and the feature information of the human being first entering can be collected on the tracking path. After 5 seconds, the feature information of the human being first entering is confirmed through calculation, and the unique identity number is assigned to the human being first entering for binding. Then the feature information and the corresponding identity number are recorded.

The present disclosure collects convolutional neural network (CNN) features of the human being in the detection boxes of these consecutive frames as the feature information. Specifically, "detection" is the human being detection based on the convolutional neural network (CNN). "Feature information" is a collection of features of various aspects such as posture, dress and stature of the human being extracted by the convolutional neural network (CNN) technology. Training is performed based on the disclosed CNN network for the human being detection and the feature extraction in combination with collected and labeled multi-camera human being tracking data, to perform pedestrian detection, and improve the human being feature network.

According to an exemplary embodiment of the present disclosure, the feature information of the human being includes: stature, dress, and/or appearance. The stature may include height and weight of a human being, and the dress may include clothes type and color of a human being.

According to an exemplary embodiment of the present disclosure, the feature information and the identity number are stored in a human being feature database.

In S106, when re-identification of the human being in the closed place is performed, feature information of the human being captured by the camera in an area where the human being is located is matched with recorded feature information, and the identity number bound with the recorded feature information that best matches the feature information of the human being is selected as the identity number of the human being.

Since the feature information is collected for each human being first entering in S104, the identity of the human being framed by any human being detection box can be identified based on the comparison of the feature information. When it is necessary to re-identify a human being in a certain area of the closed place, the feature information of the human being acquired through the designated responsible camera in the area where the human being is located is matched with the recorded feature information, and the identity number bound with the recorded feature information that best matches the feature information of the human being is selected as the identity number of the human being. For example, as shown in FIG. 1 when someone wants to know the identity of the man who picks up the goods on the smart shelf in the lower right corner (standing at the white box), the feature information of the man acquired through the designated responsible camera in the area where the man is located is matched with the recorded feature information, and the identity number bound with the most matched feature information is used as the identity number of the man, and the identity of the man is determined to be the customer XXX (or XX number). Similarly, acquiring the feature information of the man is also performed by the convolutional neural network technology.

Further, considering that the distinction of feature information between beings may be not clear (for example, it is not easy to distinguish two human beings wearing black clothes), the present disclosure performs association matching on all human beings in the entire screen. This associating and matching all human beings with the identities can help find global optimal matching, which improves the tolerance of the feature information comparison greatly compared with the human being re-identification in a single detection box. This process enables real-time processing.

A specific example is shown in FIG. 4. In any frame that needs the re-identification, the collected feature information is used to perform optimal association matching for all human beings in the area. That is to say, although we only want to re-identify a certain human being (such as a lady wearing the black clothes on the rightmost side of the screen in FIG. 4), matching is performed on all human beings in the area where the human being (the lady) is located, which can greatly improve the tolerance of feature comparison. That is, because the lady in black is not easy to distinguish from other human beings in black or dark clothes (that is, there are more than one identity number corresponding to the feature information that the color of the clothes is black), which may result in a matching error, the matching is performed on all the human beings. Others in black or dark clothes may have other types of clearly distinguishing features that can quickly and clearly identify them, thus the identities (numbers) of others in black or dark clothes can be quickly confirmed by the clearly distinguishing features, and these human beings (or the identity numbers) can be excluded. As such, there is only one identity number corresponding to the feature information that the color of the clothes is black. This identity number is the identity number of the lady.

According to an exemplary embodiment of the present disclosure, when a human being leaves, the feature information of the human being is deleted and the human being is marked as having left, as shown in S508 in FIG. 5. S502-S506 are the same as S102-S106, which will not repeated here.

In S508, when the camera that monitors the area of the entrance (a closed place shared by the entrance and exit) or the exit (a closed place with separated entrance and exit) detects a human being leaving, the feature information of the human being is deleted and the human being is marked as having left, and the bound identity number of the human being is released.

FIG. 6 shows a block diagram of a system for re-identifying a human being in a closed place according to an exemplary embodiment of the present disclosure.

As shown in FIG. 6, the system 600 for re-identifying a human being in a closed place may include a monitoring module 602, a first entered human being confirmation module 604, and a re-identification module 606.

The monitoring module 602 is configured to divide the closed place into multiple areas including an entrance area, and have at least one camera for shooting in any area. The first entered human being confirmation module 604 is configured to confirm a human being first entering based on a trajectory tracking of a human being in the entrance area, assign a unique identity number to the human being, acquire and record the feature information of the human being, and bind the identity number with the feature information of the human being. The re-identification module 606 is configured to: when re-identification of the human being in the closed place is required, match feature information of the human being captured by the camera in an area where the human being is with recorded feature information, and select the identity number bound with the recorded feature information that best matches the feature information of the human being as the identity number of the human being.

In addition, the system 600 may further include a feature database 608, configured to store the feature information and the identity number.

As another aspect, the present disclosure also provides a computer-readable medium, which may be included in the system described in the above embodiments; or may exist alone without being assembled into the system. The computer-readable medium described above carries one or more programs, and the one or more programs, when executed by one system, causes the system to execute: dividing the closed place into multiple areas including an entrance area, and having at least one camera for shooting in any area; confirming a human being first entering based on a trajectory tracking of a human being in the entrance area, assigning a unique identity number to the human being, acquiring and recording the feature information of the human being, and binding the feature information with an identity number; and when re-identification of the human being in the closed place is required, matching the feature information of the human being captured by the camera in an area where the human being is with the recorded feature information, and selecting the identity number bound with the recorded feature information that best matches the feature information of the human being as the identity number of the human being.

FIG. 7 shows a terminal device according to an exemplary embodiment of the present disclosure.

As shown in FIG. 7, the terminal device 700 may include a processor 710 and a memory 720. In addition, according to an embodiment, the terminal device may further include a transmitter and a receiver.

The processor 710 may invoke instructions stored in the memory 720 to control related operations, such as controlling the transmitter and receiver to perform signal transmission and reception. According to an embodiment, the memory 720 stores instructions for the processor 710 to control the following operations: dividing the closed place into multiple areas including an entrance area, and having at least one camera for shooting in any area, confirming a human being first entering based on a trajectory tracking of a human being in the entrance area, assigning a unique identity number to the human being, acquiring and recording the feature information of the human being, and binding the feature information with an identity number; and when re-identification of the human being in the closed place is required, matching the feature information of the human being captured by the camera in an area where the human being is with the recorded feature information, and using the identity number bound with the most matched feature information as the identity number of the human being. The processor 710 may invoke instructions stored in the memory 720 to control related operations. It is easy to understand that the memory 720 may further store instructions for the processor 710 to control other operations according to the embodiments of the present disclosure, which will not be described herein again.

From the above detailed description, those skilled in the art can easily understand that the method, system and terminal device according to the embodiments of the present disclosure have one or more of the following advantages.

According to some exemplary embodiments of the present disclosure, by adopting a solution with combination of the multi-camera-based, the trajectory tracking and feature matching, the problem of the human being re-identification in real-time and in the complex scene is solved, achieving a better effect of the human being re-identification.

According to some exemplary embodiments of the present disclosure, by disposing multiple cameras in the place to cover different areas and different angles, any area can be shot by two or more cameras from different angles, which can solve the problem of occlusion between the human beings.

According to some exemplary embodiments of the present disclosure, by performing association matching on all human beings in the entire screen, associating and matching all human beings with the identities can help find global optimal matching, which improves the tolerance of the feature comparison greatly compared with the human being re-identification in a single detection box.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for re-identifying a human being in a closed place, comprising:
   dividing the closed place into multiple areas comprising an entrance area, and having at least one camera for shooting in any area;
   confirming a human being first entering based on a trajectory tracking of the human being in the entrance area, assigning an identity number to the human being, acquiring and recording the feature information of the human being, and binding the identity number with the feature information of the human being; and
   when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

2. The method according to claim 1, further comprising: when the human being leaves, deleting the feature information of the human being and marking the human being as having left.

3. The method according to claim 1, wherein having at least one camera for shooting in any area comprises:
   having two cameras with different shooting angles for shooting in any area.

4. The method according to claim 1, wherein confirming a human being first entering based on a trajectory tracking of the human being in the entrance area comprises:
   judging whether the human being is the human being first entering according to a trajectory of the human being displayed on continuous shot screens with multiple frames of the entrance area.

5. The method according to claim 1, wherein acquiring feature information of the human being is performed by a convolutional neural network technology.

6. The method according to claim 1, wherein the feature information of the human being comprises: stature, dress, and/or appearance.

7. The method according to claim 1, wherein matching the feature information of the human being captured by the camera in an area where the human being is with the recorded feature information comprises: performing matching on all human beings in the area.

8. The method according to claim 1, wherein the feature information and the identity number are stored in a human being feature database.

9. A system for re-identifying a human being in a closed place, comprising:
   a processor; and
   a memory storing instructions for the processor to control the following operations:
   dividing the closed place into multiple areas comprising an entrance area, and having at least one camera for shooting in any area;
   confirming a human being first entering based on a trajectory tracking of the human being in the entrance area, assigning an identity number to the human being, acquiring and recording the feature information of the human being, and binding the identity number with the feature information of the human being; and
   when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

10. The system according to claim 9, further comprising a feature database, configured to store the feature information and the identity number.

11. The system according to claim 9, wherein the processor is further configured to delete the feature information of the human being and marking the human being as having left, when the human being leaves.

12. The system according to claim 9, wherein having at least one camera for shooting in any area comprises:
having two cameras with different shooting angles for shooting in any area.

13. The system according to claim 9, wherein confirming a human being first entering based on a trajectory tracking of the human being in the entrance area comprises: judging whether the human being is the human being first entering according to a trajectory of the human being displayed on continuous shot screens with multiple frames of the entrance area.

14. The system according to claim 9, wherein acquiring feature information of the human being is performed by a convolutional neural network technology.

15. The system according to claim 9, wherein the feature information of the human being comprises: stature, dress, and/or appearance.

16. The system according to claim 9, wherein matching the feature information of the human being captured by the camera in an area where the human being is with the recorded feature information comprises: performing matching on all human beings in the area.

17. The system according to claim 9, wherein the feature information and the identity number are stored in a human being feature database.

18. A non-transitory computer-readable storage medium having a computer program stored thereon, wherein the program, when executed by a processor, causes to perform steps of the following method:
dividing the closed place into multiple areas comprising an entrance area, and having at least one camera for shooting in any area;
confirming a human being first entering based on a trajectory tracking of the human being in the entrance area, assigning a unique identity number an identity number to the human being, acquiring and recording the feature information of the human being, and binding the identity number with the feature information of the human being; and
when re-identification of a human being in the closed place is performed, matching the feature information of the human being captured by the camera in an area where the human being is with the recorded feature information, and selecting the identity number bound with the recorded feature information that best matches the feature information of the human being as the identity number of the human being.

* * * * *